(12) United States Patent
Allan

(10) Patent No.: US 7,877,435 B2
(45) Date of Patent: Jan. 25, 2011

(54) METHOD AND SYSTEM FOR TRANSACTION PIPELINE DECOMPOSITION

(75) Inventor: Ronald C. Allan, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 2559 days.

(21) Appl. No.: 10/177,817

(22) Filed: Jun. 20, 2002

(65) Prior Publication Data

US 2003/0236877 A1    Dec. 25, 2003

(51) Int. Cl.
G06F 15/16 (2006.01)
G06F 15/173 (2006.01)

(52) U.S. Cl. ....................... 709/201; 709/224

(58) Field of Classification Search ............. 709/224, 709/201, 223; 718/102, 1, 106
See application file for complete search history.

(56) References Cited

U.S. PATENT DOCUMENTS

| | | | | |
|---|---|---|---|---|
| 5,542,047 A | 7/1996 | Armstrong | ............ | 395/200.11 |
| 5,627,766 A | 5/1997 | Beaven | ............ | 364/551.01 |
| 5,729,472 A | 3/1998 | Seiffert et al. | ............ | 364/550 |
| 5,794,003 A * | 8/1998 | Sachs | ............ | 712/215 |
| 5,872,972 A * | 2/1999 | Boland et al. | ............ | 718/102 |
| 6,021,437 A | 2/2000 | Chen et al. | ............ | 709/224 |
| 6,028,914 A | 2/2000 | Lin et al. | ............ | 379/14 |
| 6,061,725 A | 5/2000 | Schwaller et al. | ............ | 709/224 |
| 6,085,243 A | 7/2000 | Fletcher et al. | ............ | 709/224 |
| 6,108,700 A | 8/2000 | Maccabee et al. | ............ | 709/224 |
| 6,119,174 A | 9/2000 | Borowsky et al. | ............ | 710/15 |
| 6,122,664 A | 9/2000 | Boukobza et al. | ............ | 709/224 |
| 6,144,961 A | 11/2000 | de la Salle | ............ | 707/10 |
| 6,157,618 A | 12/2000 | Boss et al. | ............ | 370/252 |
| 6,178,449 B1 | 1/2001 | Forman et al. | ............ | 709/224 |
| 6,269,330 B1 | 7/2001 | Cidon et al. | ............ | 704/43 |
| 6,282,570 B1 | 8/2001 | Leung et al. | ............ | 709/224 |
| 6,286,046 B1 | 9/2001 | Bryant | ............ | 709/224 |
| 6,308,208 B1 | 10/2001 | Jung et al. | ............ | 709/224 |
| 6,314,463 B1 | 11/2001 | Abbott et al. | ............ | 709/224 |
| 6,336,139 B1 | 1/2002 | Feridun et al. | ............ | 709/224 |
| 6,438,592 B1 * | 8/2002 | Killian | ............ | 709/224 |
| 6,631,411 B1 * | 10/2003 | Welter et al. | ............ | 709/224 |
| 6,651,099 B1 * | 11/2003 | Dietz et al. | ............ | 709/224 |
| 6,658,453 B1 * | 12/2003 | Dattatri | ............ | 709/202 |
| 6,662,227 B2 * | 12/2003 | Boyd et al. | ............ | 709/224 |
| 6,850,811 B1 * | 2/2005 | Stewart | ............ | 700/110 |
| 7,233,331 B2 * | 6/2007 | Kato | ............ | 345/426 |

(Continued)

*Primary Examiner*—Nathan Flynn
*Assistant Examiner*—Chirag Patel
(74) *Attorney, Agent, or Firm*—Yee & Associates, P.C.; Jeffrey S. LaBaw

(57) ABSTRACT

A method, system, apparatus, and computer program product are presented for decomposing a transaction pipeline by capturing metric data about the completion of transactions within the transaction pipeline, such as an elapsed time that is required to complete a transaction at each stage of the transaction pipeline. A set of agents are among a set of servers that respond to transaction requests for resources. Two or more servers can be substantially logically grouped into a transaction pipeline in which an upstream server precedes a downstream server if the upstream server initiates a subsequent transaction to the downstream server so as to complete a previous transaction at the upstream server. Each agent is associated with a server in the transaction pipeline. An agent gathers metric data about transactions that are initiated by the agent, which are directed to a downstream server of the server with which each agent is associated.

60 Claims, 7 Drawing Sheets

U.S. PATENT DOCUMENTS

| | | | |
|---|---|---|---|
| 7,290,056 B1 * | 10/2007 | McLaughlin, Jr. | 709/230 |
| 7,426,738 B2 * | 9/2008 | Deverill et al. | 719/328 |
| 2002/0062237 A1 * | 5/2002 | Matsumoto et al. | 705/7 |
| 2002/0184575 A1 * | 12/2002 | Landan | 714/47 |
| 2003/0191988 A1 * | 10/2003 | Dalal et al. | 714/39 |
| 2003/0208580 A1 * | 11/2003 | Presley | 709/223 |
| 2004/0267878 A1 * | 12/2004 | Osias | 709/203 |

* cited by examiner

METHOD AND SYSTEM FOR TRANSACTION PIPELINE DECOMPOSITION

BACKGROUND OF THE INVENTION

1. Field of the Invention

The present invention relates to an improved data processing system and, in particular, to a method and apparatus for information processing. Still more particularly, the present invention relates generally to recording and analyzing information about the performance of communication sessions between client applications and server applications in a network environment.

2. Description of Related Art

As electronic commerce has matured, enterprises have turned from developing a presence on the World Wide Web to maintaining and improving their e-commerce operations. Most e-commerce enterprises need to provide a high quality of service along with a professional appearance in order to compete effectively with other electronic business services, i.e. e-businesses. A variety of products and services are now commercially available for monitoring characteristics of Web sites via the testing of Web site functionality and the gathering of performance measurement data or metrics.

A significant factor in a customer's satisfaction with an e-business is the response time that is experienced by the customer while engaging in an e-commerce transaction. If a user feels that a e-commerce transaction, such as purchasing a product through a Web site, is relatively slow, the user may become dissatisfied with the Web site and may make subsequent purchases through another Web site. Most e-businesses want to ensure that customers are receiving an appropriate response time, and performance metrics for the operations of an e-business must be gathered in order to determine the response time and other quality-of-service characteristics that might be experienced by a user. Although resource-oriented metrics, such as server load-factors and bandwidth utilization, are important metrics for determining the operational performance of an e-commerce installation, these metrics do not necessarily provide information about the so-called end-to-end response times that a user directly observes with the e-commerce installation. Hence, various methods have been developed to measure end-to-end response times by simulating transactions that a typical user might request through an e-commerce installation.

While discovering average end-to-end response times for a typical user's e-commerce transaction can provide a guide as to whether the response time needs to be improved, such information is usually insufficient for determining the manner in which an e-commerce installation should be modified in order to improve the quality of service. Although many Web sites are supported by relatively simple server configurations, many e-commerce operations have become complex. From a user's perspective, a simple purchase on a Web site may appear to be a single transaction. From an operator's perspective, a user's interactive session with an e-commerce installation involves a set of many operations through many different applications. In other words, a single user interaction may involve a set of transactions, also called a transaction pipeline. The operator of an e-commerce enterprise needs information about each transaction along the transaction pipeline in order to improve poorly performing user interactions.

Therefore, it would be advantageous to provide a method and system for decomposing the operation of a transaction pipeline into distinct transactions such that information can be gathered about each of the many transactions within an e-business installation.

SUMMARY OF THE INVENTION

A method, system, apparatus, and computer program product are presented for decomposing a transaction pipeline by capturing metric data about the completion of transactions within the transaction pipeline, such as an elapsed time that is required to complete a transaction at each stage of the transaction pipeline. A set of agents are among a set of servers that respond to transaction requests for resources. Two or more servers can be substantially logically grouped into a transaction pipeline in which an upstream server precedes a downstream server if the upstream server initiates a subsequent transaction to the downstream server so as to complete a previous transaction at the upstream server. Each agent is associated with a server in the transaction pipeline. An agent gathers metric data about transactions that are initiated by the agent, which are directed to a downstream server of the server with which each agent is associated.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
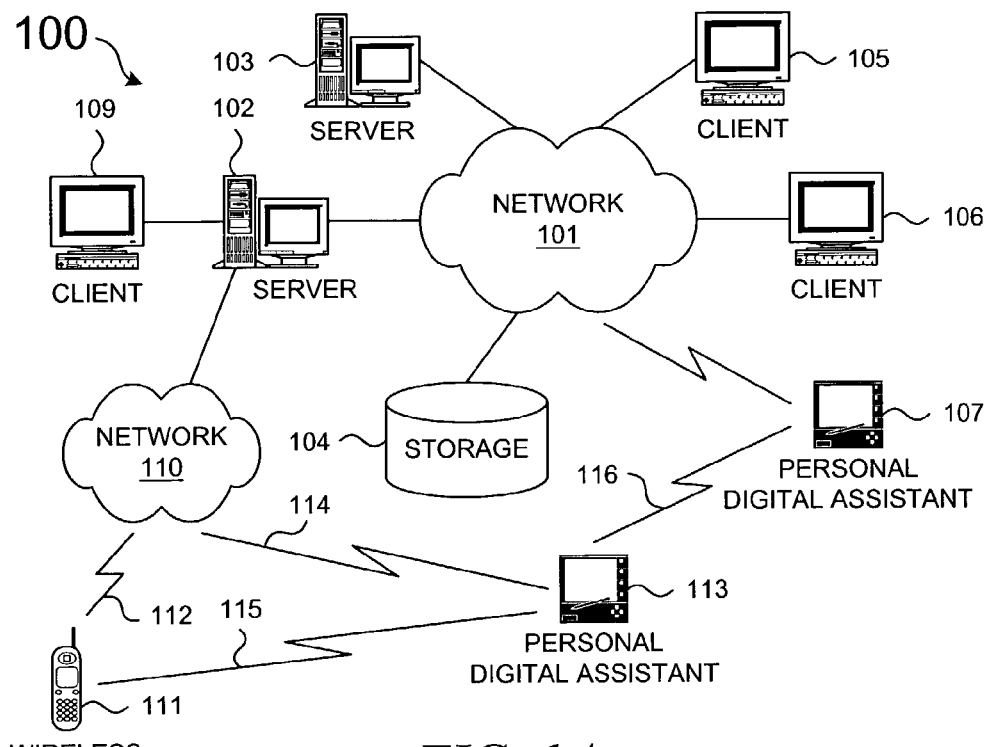
FIG. 1A depicts a typical distributed data processing system in which the present invention may be implemented.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
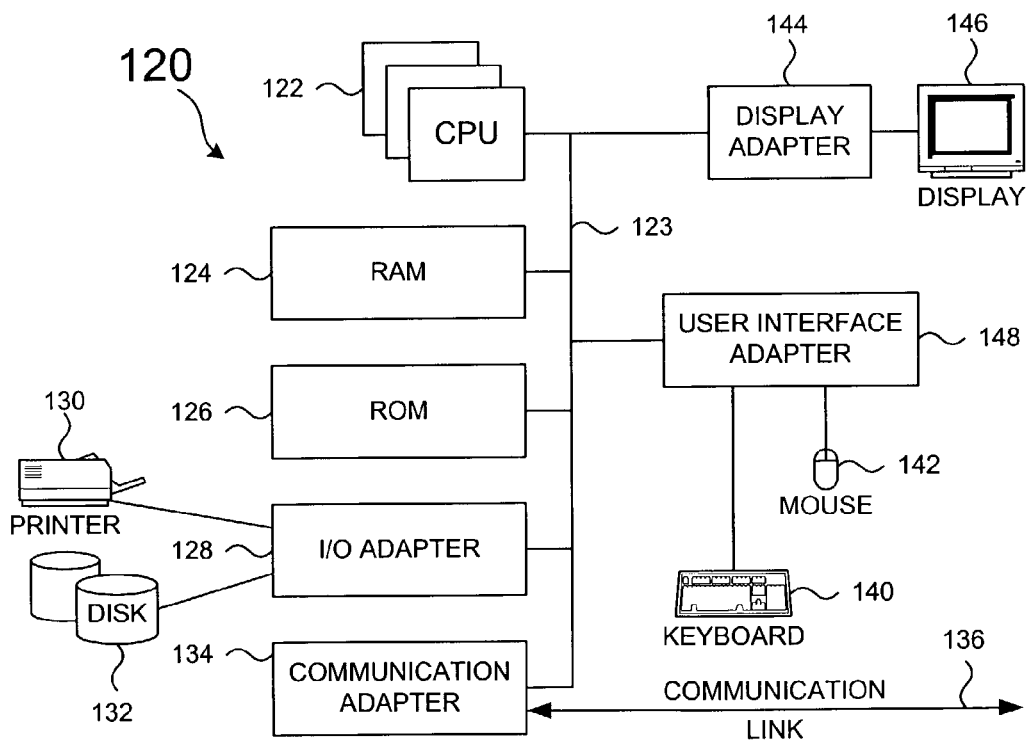
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. In other words, one of ordinary skill in the art would not expect to find similar components or architectures within a Web-enabled or network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. Hence, it should be noted that the distributed data processing system shown in FIG. 1A is contemplated as being fully able to support a variety of peer-to-peer subnets and peer-to-peer services.

The present invention may be implemented on a variety of hardware and software platforms, as described above. More specifically, though, the present invention is directed to a technique for decomposing a transaction pipeline, e.g., a chain of server applications within an e-business installation, in order to obtain information that is more granular than a typical prior art solution of obtaining an end-to-end response time for a user interaction. The technique of the present invention allows the statistical behavior of each section or "hop" within a transaction pipeline to be analyzed in an attempt to isolate processing bottlenecks and potential failures. In other words, the gathered information should act as a guide in the determination and isolation of slowdowns or other problems along with the determination of potential remedies. The technique of the present invention is described in more detail with respect to the remaining figures.

Figure 2:
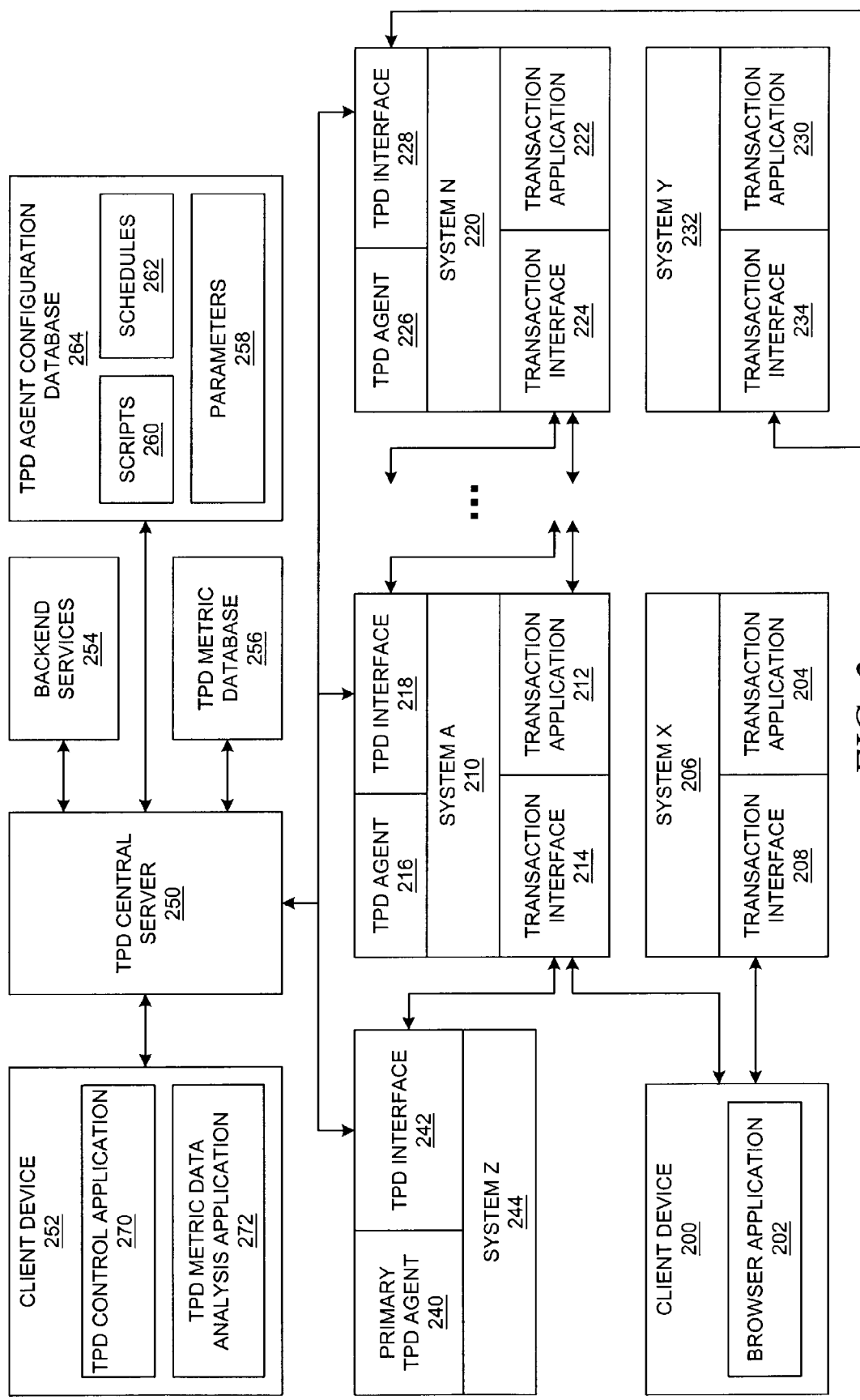
FIG. 2 is block diagram that depicts a network of data processing systems comprising an infrastructure of semi-autonomous or autonomous agents along a transaction pipeline that operate in cooperation with a central server.

With reference now to FIG. 2, a block diagram depicts a network of data processing systems comprising an infrastructure of semi-autonomous or autonomous agents along a transaction pipeline that operate in cooperation with a central server in accordance with an embodiment of the present invention. From a user perspective, a transaction may complete a single user-requested operation. From a technical perspective, a transaction may be regarded as a set of communication protocol actions between entities.

A transaction pipeline comprises a substantially ordered set of one or more transactions; each of the transactions can be regarded as representing a stage of the pipeline. At each stage within the transaction pipeline, one or more transactions are attempted and/or completed for a particular user interaction or request. For example, when a user requests a Web page from a server, the user's request represents an original transaction that may set in motion a set of one or more transactions that must be completed in order to fulfill the original request. Because the original server may not control all of the resources that are required to fulfill the original request, the original server may need to contact another server which represents another transaction, and the secondary server may need to submit a search query to a database engine, which is yet another transaction. In addition, possibly in parallel with the other transactions, the first server may need to collect fees for the service that is being provided to the user, so the first server may contact a financial institution's server, thereby initiating another transaction. One can understand that a single user request can quickly fan out to require the completion of multiple transactions.

While the term "transaction pipeline" may be used to describe a set of transactions that is necessary for the user's request, the set of transactions does not necessary follow a linear series of transactions but may branch into one or more transaction pipelines or streams to comprise a transaction web of multiple transactions; at times, the transaction streams may operate in parallel and not strictly in series. A transaction pipeline can be regarded as a special case of a transaction web in which the flow of transactions is substantially linear, whereas a transaction web can be regarded as a more general case in which the flow of transactions may branch into multiple transaction streams. The term "transaction pipeline" is used as a general term hereinbelow; the term "transaction web" is used hereinbelow only when a distinction needs to be made between a transaction pipeline and a transaction web.

The transactions that comprise a transaction pipeline or transaction web can be substantially ordered. As noted above, each transaction pipeline stage may subsequently initiate additional transactions from other transaction pipeline stages. Hence, there is an order or flow to the transactions that result from the original transaction. The flow of server requests for those additional transactions from the original user request to the final stage of the transaction pipeline can be described as moving "downstream" through the transaction pipeline stages; responses to those requests can be described as moving "upstream" through the transaction pipeline stages. If the transaction web comprises only a linear series of transactions, i.e. a transaction pipeline, then each stage of the transaction pipeline has at most one adjacent downstream stage; if the transaction pipeline fans out to a web of multiple transaction streams, then at least some of the stages of the transaction pipeline will have more than one adjacent downstream stage.

As noted above, the present invention is directed to a technique for decomposing a transaction pipeline. The term "decomposing" refers to operations for obtaining availability and/or performance metrics about stages within the transaction pipeline, and in the present invention, information is gathered about transactions throughout the transaction pipeline. In contrast to prior art techniques that gather only end-user response metrics, the present invention obtains information in more finely granular measurements representing resource availability, resource consumption, elapsed time, time delay, or other metrics associated with transaction stages throughout the transaction pipeline.

Referring now to FIG. 2, client device 200, similar to client 102 in FIG. 1, supports typical end-user applications, such as browser application 202. An end-user may interact with client 200 to access network-based resources, such as transaction application 204 supported by system 206 through transaction interface 208. Transaction application 204 represents a Web page server, search engine, directory, or some other type of network-accessible resource. Transaction interface 208 provides any required support for conducting the transactions, such as communication protocols, e.g., TCP/IP or HTTP, database engine language support, e.g., SQL, or any other interface requirements. Communications between the data processing systems shown in FIG. 2 may be through direct communication links or through a network, such as network 101 in FIG. 1. In order to access the resource provided by transaction application 204, client 200 sends a transaction request to transaction application 204 through transaction interface 208, and in most cases, client 200 subsequently receives a transaction response from transaction application 204 through transaction interface 208.

In a manner similar to system 206, system 210 supports transaction application 212 through transaction interface 214. In contrast to system 206, system 210 also supports transaction pipeline decomposition (TPD) agent 216 through TPD interface 218. TPD interface 218 provides any required support for conducting TPD operations, such as communication protocols, e.g., TCP/IP or HTTP, database engine language support, e.g., SQL, or any other interface requirements. It should be noted that TPD interface 218 may comprise much or all of the resources that comprise transaction interface 214. For example, each of these interfaces may comprise functionality within an operating system that executes on system 210, and the operating system may provide communication facilities, etc., for the processes that are executing on system 210. Moreover, in a distributed processing environment, it should be noted that supporting resources are not necessarily co-located with a process that is using the resource, e.g., remote procedure calls or similar techniques may be used to obtain resources for a process.

As mentioned above, the present invention obtains information associated with transaction stages throughout the transaction pipeline using agents. In general, an agent is a software program or similar entity that gathers information or performs a task on behalf of another entity. In the present invention, TPD agents, such as TPD agent 216, are responsible for gathering metric data about stages within the transaction pipeline on behalf of an application. The TPD agents are located and/or distributed throughout the transaction pipeline. In a preferred embodiment, there is one TPD agent associated with each stage or transaction in the transaction pipeline that one wants to monitor; in other embodiments, there may be at least one TPD agent associated with each transaction in the transaction pipeline that one wants to monitor. FIG. 2 shows multiple TPD agents deployed along a transaction pipeline; for example, system 220 supports transaction application 222 through transaction interface 224, and at the same time, system 220 also supports TPD agent 226 through TPD interface 228.

A TPD agent of the present invention gathers information about the responses that are experienced by the server and/or application with which it was associated when it was deployed. Stated in another manner, a TPD agent of the present invention gathers information about the responses that are experienced by the transaction pipeline stage at which it is deployed. The operation of the TPD agents of the present invention can be described in yet another manner, which is that a TPD agent gathers metric data associated with responses from at least one adjacent, downstream stage of the transaction pipeline.

A system analyst may want to gather metric data at each transaction pipeline stage; in that case, a TPD agent is associated with each transaction pipeline stage. In a preferred embodiment, a TPD agent that is associated with a transaction pipeline stage executes on the same system or device on which the applications and/or servers comprising the transaction pipeline stage execute. Although, in the preferred embodiment, most TPD agents are co-located with a system or an application of interest within a transaction pipeline, it should be noted that the first and last stages of a transaction pipeline represent special cases. An example of a last-stage case is shown in FIG. 2 with TPD agent 228 that initiates a transaction to transaction application 230 on system 232 through its transaction interface 234, yet system 232 does not include a TPD agent. It should also be noted that the term "server" may refer to a physical hardware device that provides access to a resource or to a software application that provides access to a resource, wherein a resource may include a wide variety of hardware or software entities or portions thereof.

A variety of reasons may exist for the fact that system 232 does not include a TPD agent. One reason could be that transaction application 230 is known to be the last transaction stage in a particular transaction pipeline or transaction stream; in other words, it is known that transaction application 230 does not initiate additional downstream transactions, and therefore, a TPD agent has not been deployed because it is known that transaction application 230 does not experience any responses from downstream transactions. Another reason could be that a system analyst has not requested the deployment of a TPD agent to system 232 because the system analyst has decided that additional transaction stages downstream from system 220 (not shown in FIG. 2) are not consequential or not important; hence, metric data from transactions further downstream from system 232 are not of interest.

An example of a first-stage case is shown in FIG. 2 with primary TPD agent 240 operating through its TPD interface 242 on system 244. The TPD agent on system 244 is termed a "primary" TPD agent because it synthesizes a first transaction in the transaction pipeline. In this manner, the primary TPD agent can be interpreted as representing a virtual user because the metric data that is collected by TPD agent should be substantially the same as the end-to-end response times that an actual user would experience, e.g., through client device 200. It should be noted that a primary TPD agent is not necessarily required if a system analyst determines that a sufficient statistical picture of the performance of a transaction pipeline can be generated from the metric data that is gathered by the other TPD agents throughout the transaction pipeline. However, as noted above, the metric data that is collected by the primary TPD agent should be similar to actual user experiences, so it is likely that a primary TPD agent would be deployed in most implementations of the present invention. It should also be noted that the primary TPD agent does not require a dedicated system as shown in FIG. 2. For example, the primary TPD agent could be deployed on TPD central server 250 or client device 252.

TPD central server 250 supports metric data collection and TPD agent configuration and control in cooperation with a variety of backend services 254, if necessary. For example, various distributed infrastructures could be used to support the present invention, such as the Tivoli™ Management Environment, which is available from International Business Machines, assignee of the present invention. Metric data that is collected from the TPD agents may be stored in TPD metric database 256. Configuration parameters 258, scripts 260, schedules 262, or other information may be stored in TPD agent configuration database 264. As shown in FIG. 1, these databases and other services could be located throughout a network.

Client device 252 supports TPD control application 270, which may be a stand-alone application or may be a Web-based application that uses plug-ins, ActiveX controls, Web pages, or other similar technologies through a Web-browser-type platform. A system analyst that wants to monitor the performance of a particular transaction pipeline may use TPD control application 270 in conjunction with information in TPD agent configuration database 264 to configure and monitor a set of TPD agents for a particular transaction pipeline. The manner in which a TPD agent operates in a configuration context is described in more detail below.

Client device 252 also supports TPD metric data analysis application 272, which may be a stand-alone application or an application on a Web-browser-type platform. After the TPD agents have submitted metric data about a particular transaction pipeline for storage in TPD metric database 256, a system analyst can examine the metric data using TPD metric data analysis application 272 to find processing bottlenecks or other types of inefficiencies or problems within the transaction pipeline. The manner in which the distributed system collects TPD metric data is described in more detail below.

Figure 3:
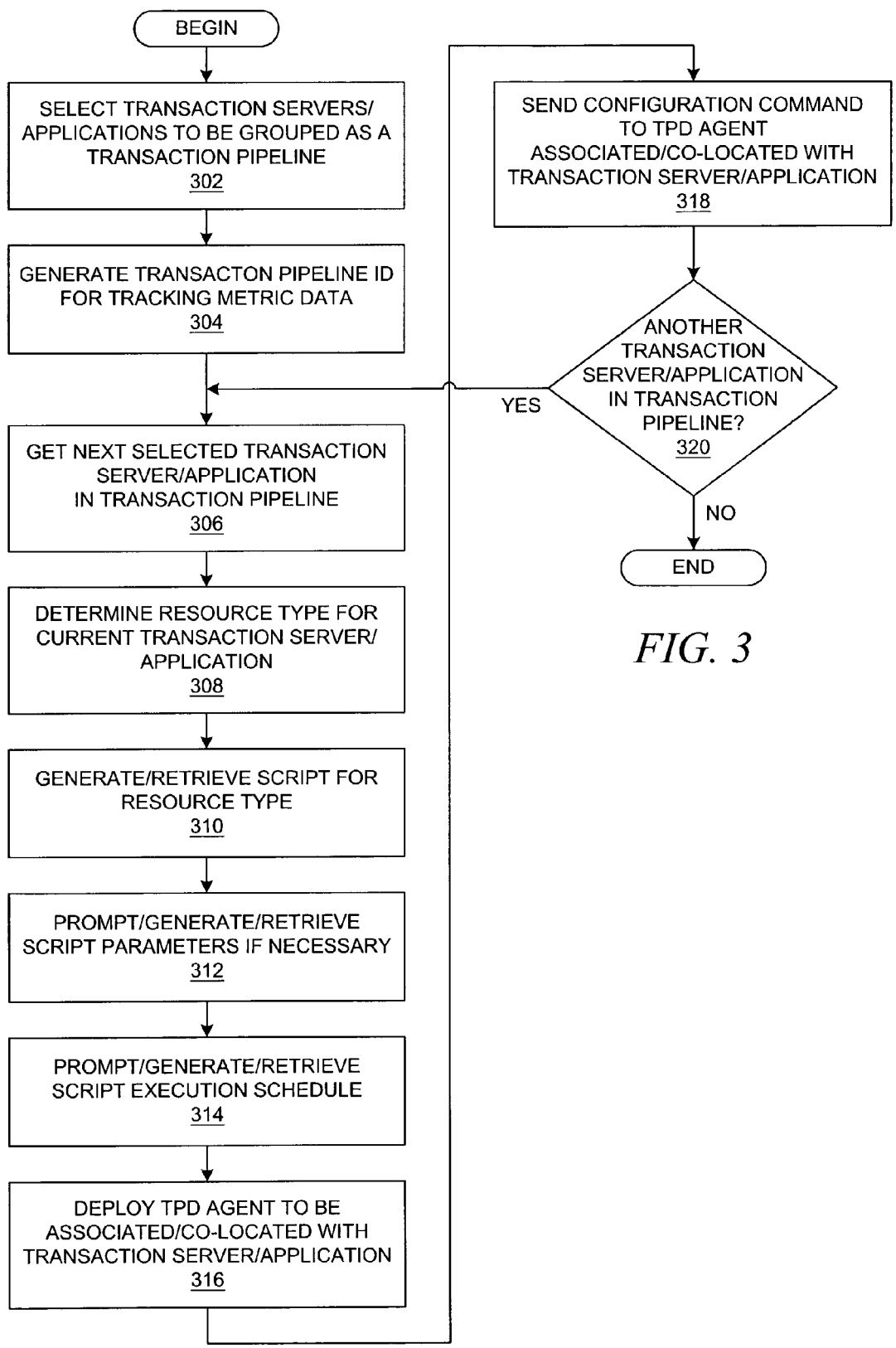
FIG. 3 is a flowchart that depicts a process by which a particular transaction pipeline is configured with transaction pipeline decomposition (TPD) agents in order to be able to collect TPD metric data for the transaction pipeline.

With reference now to FIG. 3, a flowchart depicts a process by which a particular transaction pipeline is configured with transaction pipeline decomposition (TPD) agents in order to be able to collect TPD metric data for the transaction pipeline. As noted above with respect to FIG. 2, a system analyst or similar user that wants to monitor the performance of a particular transaction pipeline may use TPD control application 270 to configure and monitor a set of TPD agents for a particular transaction pipeline. An example of a configuration process in the present invention is shown in FIG. 3.

The process begins with a user selecting one or more transaction servers that are to be grouped or otherwise logically associated with one another into a transaction pipeline (step 302). A transaction pipeline identifier (ID) may be associated with the newly created transaction pipeline (step 304), and the transaction pipeline ID can be used for various operations that are associated with the given transaction pipeline. Alternatively, a set of transaction servers may be obtained from other sources, such as a database or another system software application, e.g., an e-commerce software package that manages the servers.

For each server in the transaction pipeline, each server is processed individually in the following manner by looping through the set of transaction servers. A next server identity in the set is selected as the current server in the transaction pipeline to be processed (step 306). A resource type is determined for the current server (step 308), and an appropriate TPD agent script is obtained for the resource type through a variety of possible mechanisms (step 310), e.g., by generating a script, by building a script through input from a user, or by retrieving a script from a database, such as TPD agent configuration database 264. Appropriate script parameters are generated or obtained for the script (step 312) along with an appropriate script execution schedule (step 314).

If not already deployed within the network, a TPD agent that is to be associated with (and/or co-located with) a transaction server is instantiated, distributed, or otherwise deployed in a manner that is appropriate for the operational framework of the TPD agents (step 316). TPD agents may be provided through electronic distribution, through manually installment from a computer program product, or some other method. A configuration command is then sent to the newly deployed TPD agent (step 318). It should be noted that the order of and substance of the preparation and/or disbursement of the scripts, script parameters, and script schedules may vary with the underlying technology framework. For example, in one embodiment of the present invention, the operational behavior of the TPD agents is configured through a centralized application that obtains and/or generates the necessary control data/structures, while in another embodiment the necessary control data/structures are obtained by allowing a system analyst or similar user to communicate with a TPD agent directly such that each TPD agent is responsible for ensuring its proper initial configuration. In yet another embodiment, the TPD agents may login to the central server and query for configuration information and/or updates.

A determination is then made as to whether another transaction server remains unconfigured within the transaction pipeline that is being configured (step 320). If so, then the process branches back to step 306 to configure another transaction server; otherwise, the configuration process is complete.

Figure 4:
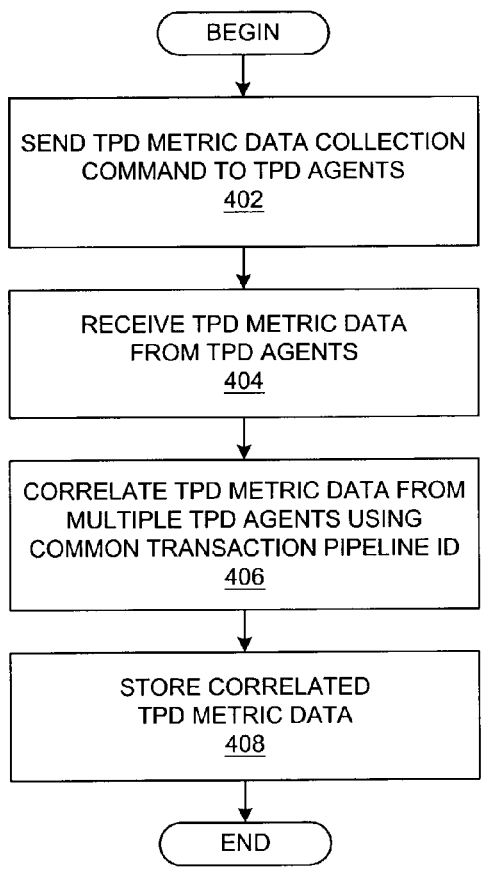
FIG. 4 is a flowchart that depicts a process by which TPD metric data is centrally collected for a particular transaction pipeline.

With reference now to FIG. 4, a flowchart depicts a process by which TPD metric data is centrally collected for a particular transaction pipeline. As part of the configuration process for analyzing a particular transaction pipeline with the transaction pipeline decomposition techniques of the present invention, a schedule or temporal mechanism for centrally collecting the TPD metric data may be requested or otherwise determined by a system analyst or similar user. Whether or not the TPD metric data is collected in accordance with a predetermined schedule or mechanism, the TPD metric data needs to be collected so that analysis of the TPD metric data may occur, as explained with respect to the process shown in FIG. 4.

The data collection process begins with a TPD metric data collection command being sent from a central server to the TPD agents along a given transaction pipeline (step 402); the central server has information about the identity and addressability of a set of TPD agents for a given transaction pipeline as determined during a configuration process for the transaction pipeline, as described with respect to FIG. 3 above. In response to the TPD metric data collection commands, the central server receives the TPD metric data (step 404). The TPD metric data from the various TPD agents within the particular transaction pipeline can be correlated using the common transaction pipeline identifier that was previously provided to each TPD agent during the configuration of the transaction pipeline (step 406). The correlated TPD metric data can then be stored for subsequent analysis (step 408), and the data collection process is complete. It should be noted that alternative data collection sequences may be used in the present invention, one of which is described below with respect to FIG. 8 and FIG. 9.

Figure 5:
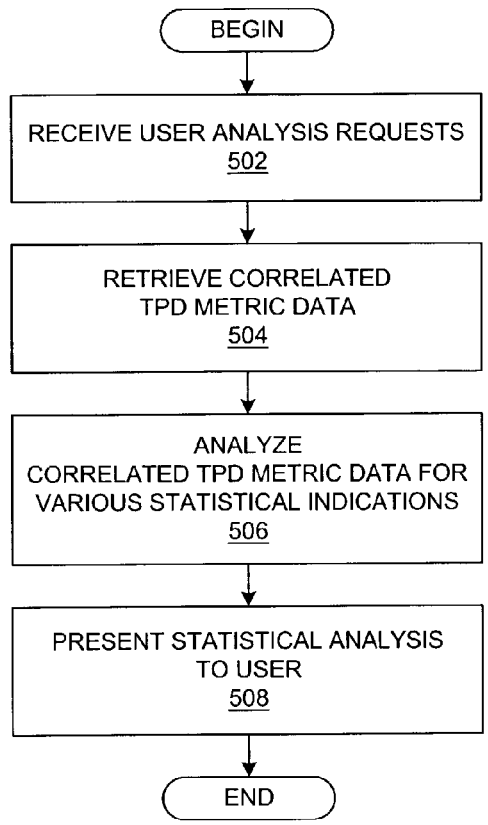
FIG. 5 is a flowchart that depicts a process by which TPD metric data is centrally analyzed for a particular transaction pipeline.

With reference now to FIG. 5, a flowchart depicts a process by which TPD metric data is centrally analyzed for a particular transaction pipeline. As noted above with respect to FIG. 2, a system analyst or similar user can employ a TPD metric data analysis application after the TPD agents have gathered metric data about a particular transaction pipeline in order to find processing bottlenecks or other types of inefficiencies or problems within the transaction pipeline, as explained with respect to the process shown in FIG. 5.

The process begins with the receipt of user analysis requests at a data analysis application (step 502). The TPD metric data that has been gathered from the TPD agents, which preferably has been pre-processed in order to correlate data that is relevant to a particular transaction pipeline, is retrieved (step 504). The TPD metric data is then analyzed for various statistical indications (step 506), and the statistical analysis is then presented to the user (step 508), thereby completing the post-processing activities.

Figure 6:
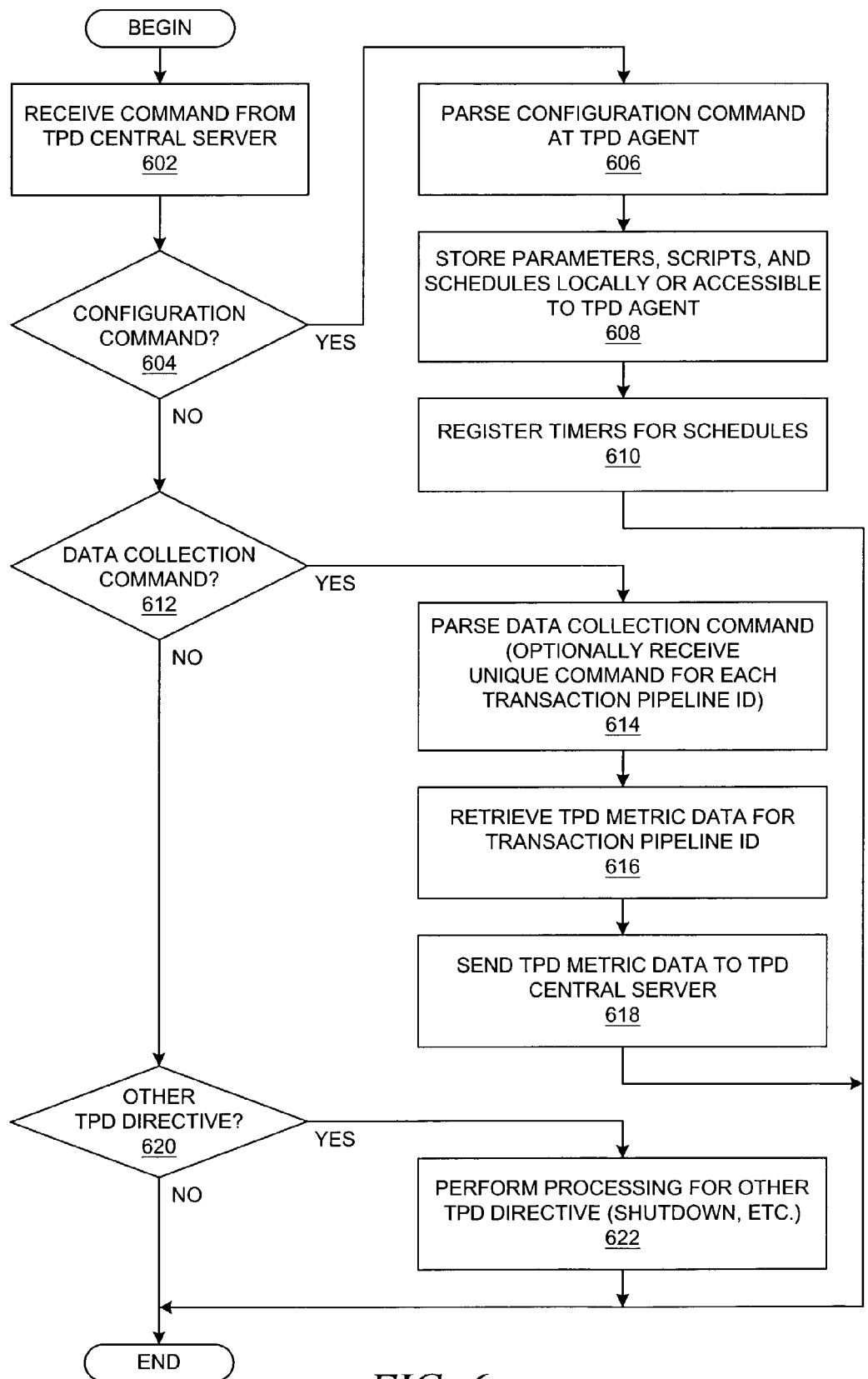
FIG. 6 is a flowchart that depicts a process in which a TPD agent for a specific stage of a particular transaction pipeline receives and processes commands from a TPD central server.

With reference now to FIG. 6, a flowchart depicts a process in which a TPD agent for a specific stage of a particular transaction pipeline receives and processes commands from a TPD central server. As noted above with respect to FIG. 2, a TPD agent communicates and receives operational support through a TPD interface, as explained with respect to the process shown in FIG. 6. Although not shown, it can be assumed that the TPD agent receives and processes data and commands through some form of event loop.

The process begins with a TPD agent receiving a command from a TPD central server (step 602) and then determining what type of command or directive has been received. If the received command is a configuration command (step 604), then the configuration command is parsed (step 606) to extract and store one or more scripts, script parameters, and script execution schedules (step 608). Additional processing may be performed when the configuration command is received, such as setting software event timers in accordance with a received script execution schedule (step 610), thereby completing the processing of this particular command.

If a configuration command has not been received at step 604, then a determination is made as to whether the TPD agent has received a data collection command (step 612). If so, then the data collection command is parsed for any parameters that may be necessary (step 614). For example, a TPD agent may operate in support of the collection of TPD metric data for more than one transaction pipeline. In that case, the TPD agent attempts to gather information about the transaction responses that are experienced by a server from different downstream transactions. In other words, the server that is associated with the TPD agent can be logically associated with more than one identifiable transaction pipeline. Hence, the TPD agent could be configured to perform multiple operations for multiple transaction pipelines. When a data collection command is received, the TPD agent needs to determine which set of TPD metric data that it has compiled should be returned in response to the data collection command, and a transaction pipeline ID could be retrieved from the data collection command for this purpose. In response to determining the transaction pipeline ID, the TPD agent retrieves the TPD metric data associated with the transaction pipeline ID (step 616) and send the TPD metric data to the TPD central server (step 618), thereby completing the processing of the data collection command.

If a data collection command has not been received at step 612, then a determination is made as to whether some other type of TPD command or directive has been received (step 620), and if so, then the appropriate processing is performed (step 622). For example, a TPD agent may receive a command to terminate itself such that a monitoring of a transaction pipeline can be shutdown from a central location, e.g., the TPD configuration application.

As noted above, a TPD agent may operate in support of the collection of TPD metric data for more than one transaction pipeline. In other words, a TPD agent could be logically grouped into multiple different sets of TPD agents in which each different set of TPD agents monitors a different transaction pipeline. In that case, the TPD agent would manage scripts with transaction pipeline identifiers, each of which is associated with a different transaction pipeline. Hence, it should be noted that, at any given time, multiple TPD agents could be configured as primary TPD agents within the network with multiple scripts and transaction pipeline identifiers in support of operations to decompose multiple transaction pipelines. In one embodiment, a TPD agent may be configured as a non-primary TPD agent with respect to a first transaction pipeline while also configured as a primary TPD agent with respect to a second transaction pipeline. In that case, the configuration information that is sent to a TPD agent for a particular transaction pipeline would indicate whether a TPD agent should act as a primary TPD agent with respect to the particular transaction pipeline.

Figure 7:
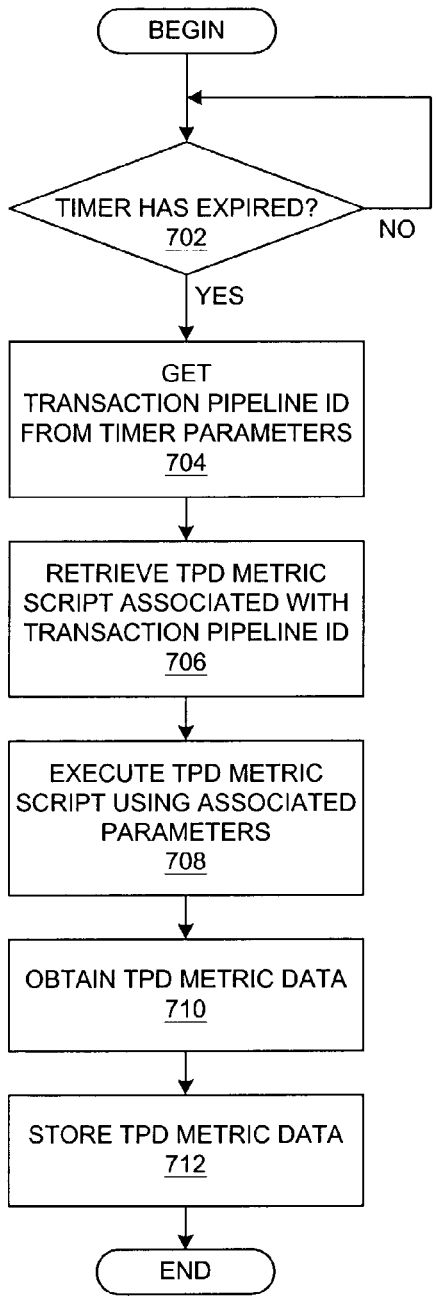
FIG. 7 is a flowchart that depicts a process by which a TPD agent for a specific stage of a particular transaction pipeline gathers and stores TPD metric data.

With reference now to FIG. 7, a flowchart depicts a process by which a TPD agent for a specific stage of a particular transaction pipeline gathers and stores TPD metric data. As explained with respect to FIG. 2 above, a TPD agent attempts to gather metric data that indicates the responses that are experienced by an associated server within a transaction pipeline. The TPD agent may be configured through a variety of mechanisms, such as the use of scripts that are executed by a TPD agent on a given time schedule. As noted above with respect to FIG. 6, a TPD agent can receive a script with its execution schedule in a configuration command, and in response, the TPD agent can set software timers that generate timer expiration events so that the TPD agent can determine when certain operations should be performed for gathering TPD metric data. The process shown in FIG. 7 describes some of those actions.

The process begins with a determination of whether or not a timer has expired, i.e. a timer that the TPD agent has previously set in accordance with an associated script execution schedule (step 702). If the timer has not expired, an execution thread for the TPD agent may continue to loop and check for its expiration. Alternatively, if supported by the underlying system, an execution thread could sleep for a particular period of time, and its awakening would signal that a desired time period has expired.

In any case, after the desired waiting period has passed, the TPD agent determines which transaction pipeline is associated with the timer (step 704), e.g., via a transaction pipeline identifier, because the TPD agent may support operations with respect to multiple transaction pipelines. Using the transaction pipeline identifier, the TPD agent retrieves the proper script (step 706) and executes the script in accordance with the script parameters (step 708). TPD metric data is generated through the execution of the script (step 710), and the generated TPD metric data is stored by the TPD agent (step 712), thereby completing the process.

Figure 8:
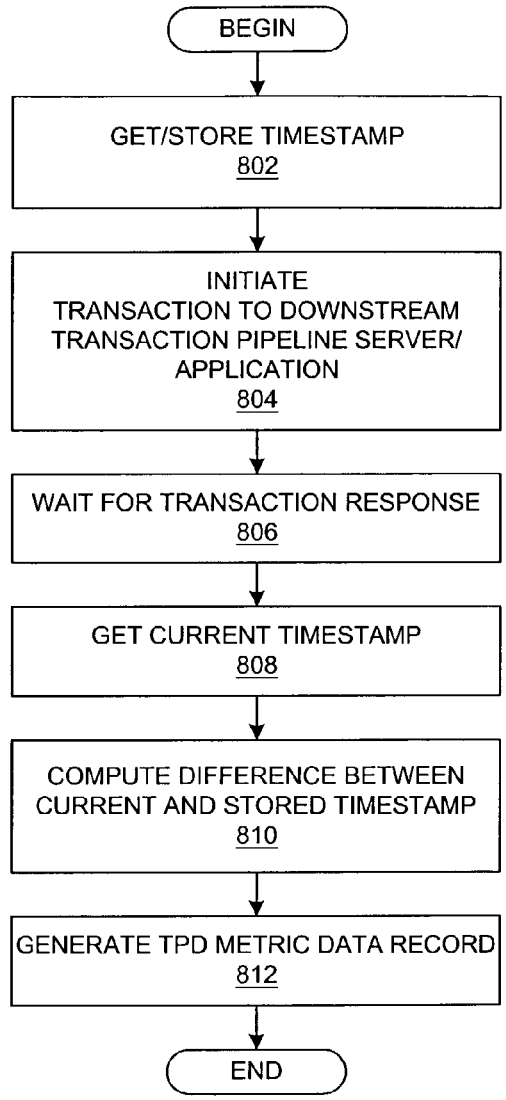
FIG. 8 is a flowchart that depicts further detail for the process by which a TPD agent obtains TPD metric data as mentioned in FIG. 7.

With reference now to FIG. 8, a flowchart depicts further detail for the process by which a TPD agent obtains TPD metric data as mentioned in FIG. 7, particularly step 710. The process begins by obtaining and storing a timestamp that indicates a current system time value (step 802) at which a script began its execution. The script is interpreted, which causes various operations to be initiated, particularly the initiation of some type of transaction that is sent to a downstream server within the transaction pipeline that is being observed by the TPD agent (step 804). In this manner, the TPD agent acts as a client to the downstream server. A response is expected at some later point in time, so the TPD agent waits for a transaction response (step 806). A variety of wait mechanisms may be used, including the use of a timeout timer or a sleeping execution thread.

Assuming no error occurs, a response is received, and a current timestamp is obtained that indicates the current system time value (step 808). A difference between the current system time value and the stored timestamp is computed and stored (step 810). A TPD metric data record is then generated (step 812), and the computed time difference is stored in the TPD metric data record to indicate the amount of time that was required to receive a response to the transaction by the TPD agent. If appropriate, other data could be stored in the TPD metric data record, such as data from the response message itself or data gathered from the system on which the TPD agent is executing.

Figure 9:
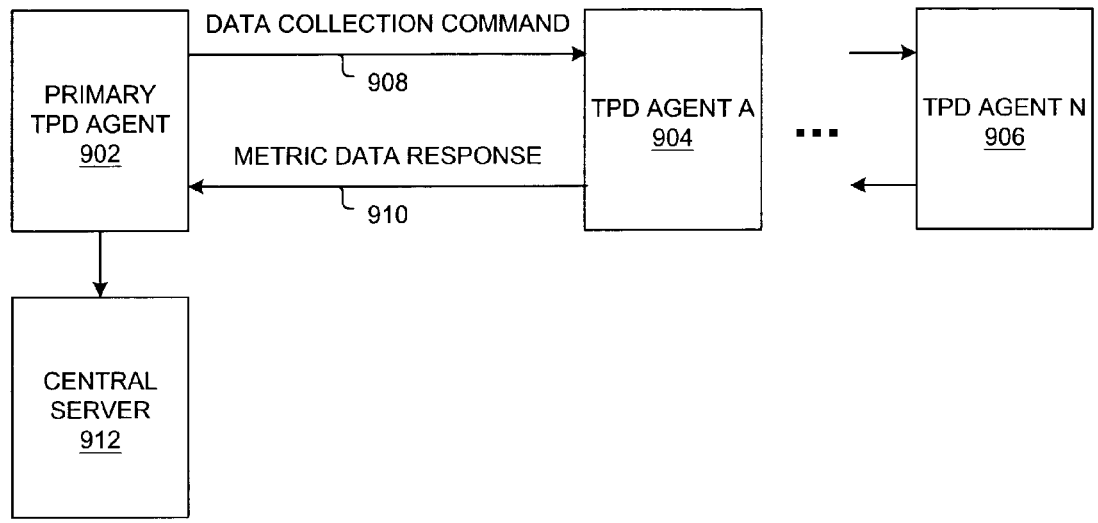
FIG. 9 is a block diagram that depicts a data collection process in which TPD metric data bubbles up from TPD agents to a primary TPD agent prior to being forwarded to a central server.

With reference now to FIG. 9, a block diagram depicts a data collection process in which TPD metric data bubbles up from TPD agents to a primary TPD agent prior to being forwarded to a central server. As noted above, a variety of data collection techniques may be employed. In one embodiment, a TPD agent could submit TPD metric data to a central server in accordance with a predetermined schedule and/or configuration parameters. In another embodiment, each TPD agent waits to receive a data collection command, and upon receiving a data collection command, a TPD agent returns TPD metric data as a response to the entity which sent the data collection command. In one case, the data collection commands may be received from a central server. In another case, the data collection commands may originate at a primary TPD agent, as shown in FIG. 9.

TPD agent 902 acts as "primary" TPD agent with respect to other TPD agents 904-906 in a transaction pipeline. When it is determined to be appropriate, the primary TPD agent originates data collection command 908 to TPD agent 904. In response, TPD agent 904 forwards the data collection command to its downstream TPD agents. Assuming there are no errors, TPD agent 906, which represents the last TPD agent in a set of TPD agents for a particular transaction pipeline, eventually receives the data collection command. In response, TPD agent 906 sends its TPD metric data for the requested transaction pipeline to the upstream TPD agent that sent the data collection command. To ensure that the failure of a particular TPD agent does not completely destroy the ability to gather TPD metric data, a TPD agent could set a watchdog timer so that it does not wait indefinitely for the return of TPD metric data.

TPD agent 904 eventually receives TPD metric data from its downstream TPD agents, appends its TPD metric data, and send the TPD metric data as TPD metric data response 910 to the TPD agent that originated the data collection command, i.e. TPD agent 902. After appending its TPD metric data, TPD agent 902 sends the accumulated TPD metric data to central server 912, which stores the data in support of analysis functions.

In contrast to other methods of sending the TPD metric data directly to a central server, FIG. 9 depicts a method in which the TPD metric data "bubbles up" from the last stage of the transaction pipeline to the first stage of the transaction pipeline, which may be advantageous for a variety of reasons. For example, a TPD agent along the transaction pipeline, either the primary TPD agent or possibly each TPD agent, may optionally perform some type of data correlation/analysis on the TPD metric data that is received from downstream TPD agents and the TPD metric data that is stored at the TPD agent. In this manner, the TPD framework can accomplish some distributed processing such that the entire burden of correlating/analyzing the TPD metric data does not fall on one entity, e.g., the central server.

Figure 10:
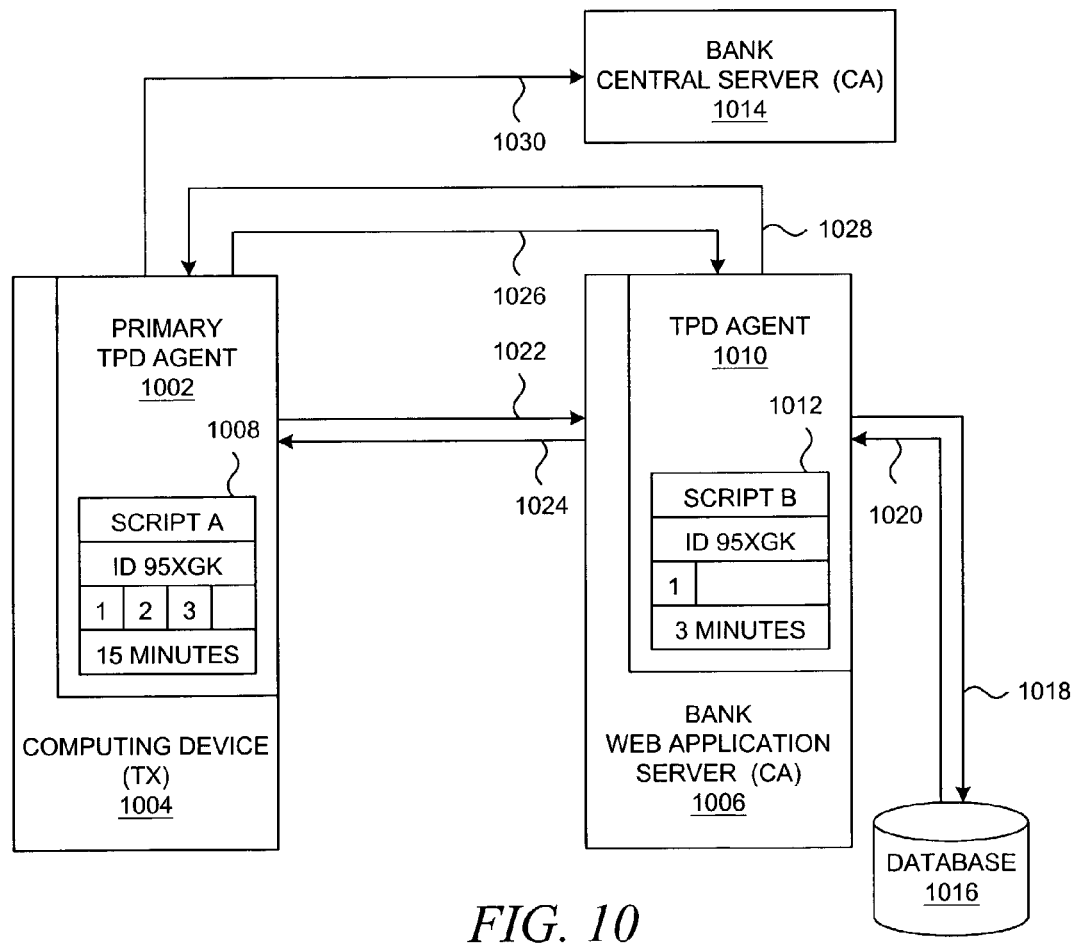
FIG. 10 is a block diagram that depicts an example in which TPD metric data is gathered using a set of TPD agents along a transaction pipeline in accordance with an embodiment of the present invention.

With reference now to FIG. 10, a block diagram depicts an example in which TPD metric data is gathered using a set of TPD agents along a transaction pipeline in accordance with an embodiment of the present invention. FIG. 10 shows a scenario in which the present invention is used in a commercial environment, specifically a bank that wants to decompose one of its transaction pipelines in its information infrastructure.

TPD agent 1002 (in this case, a primary TPD agent) has been deployed on computing device 1004, which is a device that has been specifically selected for testing server 1006 because computing device 1004 is physically located a long distance from server 1006 (Texas versus California). Hence, computing device 1004 can accurately represent a typical client machine that is used by an average customer to access the bank's systems across a long distance. Script 1008 has been configured on TPD agent 1002 using a TPD pipeline identifier that can be correlated with identical identifiers that have been used elsewhere within the transaction pipeline that is being observed. In this example, script 1008 comprises three tasks or steps for accessing and logging into the computer systems of the bank in California. The first step would direct a browser to a home page of the bank for online customer banking; the second step would login to the online customer banking system using a username and password; and the third step would logout from the online customer banking system, thereby producing an account summary. Script 1008 has been configured to be repeated every fifteen minutes.

It should be noted that more complex scripts could be configured for a TPD agent. For example, a script could contain conditional actions that are based on specific data values that might be received by a TPD agent in response to previous script operations. Hence, the number of transactions that are initiated by a TPD agent is not necessarily limited to a predetermined number.

TPD agent 1010 has been deployed on the computing device that receives the bank's customers' requests for online banking services, which in this example is Web application server 1006. TPD agent 1010 has been configured with script 1012 that contains the same transaction pipeline identifier as script 1008; the common transaction pipeline identifier allows the information from each agent to be correlated as originating from the same transaction pipeline. Script 1012 comprises only one step for generating a database query for the account information using the same username and password as configured in script 1008. Script 1012 has been configured to be repeated every three minutes.

Central server 1014 in the bank's computing system has been used to create deploy TPD agents 1002 and 1010 and to configure the TPD agents with their corresponding scripts, which are used in the following manner. Every three minutes, TPD agent 1010 executes script 1012, which creates a database connection to database 1016 using the supplied username and password and then issues SQL statement 1018 that retrieves account summary 1020, which would contain the same account summary data that is formatted into a Web page response for display to a typical online banking customer. TPD agent 1010 monitors the length of time that is required to fulfill the database request; TPD agent 1010 could also compile other TPD metric information that is relevant to the monitoring of database 1016. TPD agent 1010 could optionally perform some statistical analysis on the TPD metric data that is compiled.

Every fifteen minutes, TPD agent 1002 executes script 1008, which generates the home page request, logs into the online banking service, and then logs out. In response, an account summary Web page is received; input data stream 1022 and output data stream 1024 are shown in FIG. 10. TPD agent 1002 monitors the length of time that is required to fulfill the requests, either individually or together, and TPD agent 1002 may gather other pertinent TPD metric data related to the requests. TPD agent 1002 may also optionally perform some statistical analysis on the TPD metric data that is compiled.

In the example shown in FIG. 10, the primary TPD agent is responsible for initiating the TPD metric data collection process, collecting the data, and sending it to the central server in a manner similar to that explained above with respect to FIG. 9. In the example in FIG. 10, the primary TPD agent initiates the TPD metric data collection process for a particular transaction pipeline after each execution of the script for the transaction pipeline. Primary TPD agent 1002 sends TPD metric data collection request 1026 to TPD agent 1010 through its control interface (not shown). TPD agent 1010 determines whether there are any downstream TPD agents to which the TPD metric data collection request should be forwarded. Since it determines that there are no such downstream TPD agents, TPD agent 1010 returns TPD metric data response 1028 to primary TPD agent 1002. After receiving the response, primary TPD agent 1002 can incorporate its TPD metric data into the received TPD metric data and then send the TPD metric data to central server 1014 as message 1030. In this example, the TPD metric data would comprise a single set of TPD metric data from TPD agent 1002 for the previous fifteen minute period and five sets of TPD metric data from TPD agent 1010 for the previous fifteen minute period.

Figure 11:
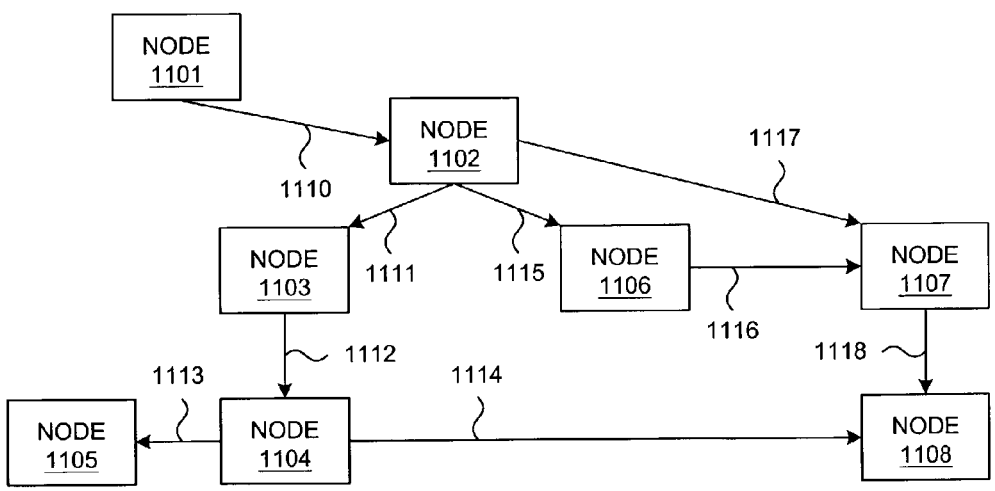
FIG. 11 is a block diagram that depicts a set of nodes within a particular network topology along with an ordered set of transactions that represent a transaction pipeline within the network.

With reference now to FIG. 11, a block diagram depicts a set of nodes within a particular network topology along with an ordered set of transactions that represent a transaction pipeline within the network. FIG. 11 provides a simple network for explaining the manner in which the TPD metric data that is obtained from a set of TPD agents can be used to determine inefficiencies or bottlenecks in a transaction pipeline. Nodes 1101-1108 represent nodes within a network at which transactions are completed in response to received requests. In the example shown in FIG. 11, the transaction pipeline may be more appropriately called a transaction web because the flow of transactions is not strictly linear. It may be assumed that a TPD agent is configured at each node, although they are not shown in the figure.

The completion of original transaction request 1110 requires the completion of multiple transactions over a period of time. Transactions flow through the transaction web in this example as follows. Node 1102 receives transaction 1110 and initiates transaction 1111 to node 1103, which then initiates transaction 1112 to node 1104. Node 1104 initiates transaction 1113, and after transaction 1113 has completed, node 1104 initiates transaction 1114, the completion of which would result in the completion of transaction 1111. Node 1102 then initiates transaction 1115, which causes node 1106 to initiate transaction 1116, the completion of which would result in the completion of transaction 1115. Node 1102 then initiates transaction 1117, which causes node 1107 to initiate transaction 1118, the completion of which would result in the completion of transaction 1117.

It is assumed that TPD metric data is collected over a period of time such that a baseline of average transaction completion times (or similar metrics) can be compiled. By monitoring for statistical changes in historical TPD metric data from multiple TPD agents over time, transaction inefficiencies or bottlenecks can be spotted. With the present invention, since TPD metric data can be collected at each stage of a transaction pipeline or transaction web, then the particular stage that is causing a problem can be identified.

In the example shown in FIG. 11, a set of average completion times for transactions 1110-1118 would be stored and then used for comparison. As the completion times stray from their historical norms, a system analyst could be alerted to the changes. The ability to gather metric data at each transaction pipeline stage allows dependencies among transactions to be taken into consideration in determining which nodes are causing problems. A processing bottleneck at node 1108 would increase the completion times for transactions 1111-1114, 1117, and 1118, while a processing bottleneck at node 1105 would only increase the completion times for transactions 1111-1113. In an analysis application, as mentioned with respect to FIG. 2, the statistical changes could be displayed graphically using a variety of techniques, such as icons or color-coded indicators.

The advantages of the present invention should be apparent in view of the detailed description that is provided above. Several solutions for gathering information about a transaction pipeline have been proposed in the prior art. One approach suggests using some form of trace header containing a marker that accompanies the use of resources along the transaction pipeline in order to track the processing that occurs for an original request. This approach can be difficult to implement because it requires an application layer that is capable of mapping or copying the marker from one application protocol to another as data packets for the original request flow along the transaction pipeline. For example, a custom header containing an identifying marker could be added to an HTTP request, and a Web server that receives the HTTP request could then recognize the custom header. However, if the Web server makes a request to a backend database, then the identifying marker from the custom header should accompany the database request, and so forth. If the backend database then uses some form of resource, then the request to this resource should also be accompanied by the identifying marker. Providing this type of tracking capability requires significant instrumentation within any other transaction pipeline participants.

Another solution is disclosed within U.S. Pat. No. 6,108,700, which has a common assignee as the present patent application and is hereby incorporated by reference. This reference teaches a method for defining events that can occur at each stage of a transaction pipeline or at the junctions between stages of a transaction pipeline, and information about these events are traced and then correlated to other events, whereby the resources that have been used for an original request can be determined. Although the ability to track the resource consumption for a single request throughout a transaction pipeline has some advantages in certain contexts, the large instrumentation effort to do so needs to be weighed against the significance of the generated information and the need for highly detailed trace information.

In contrast to the prior art, the present invention foregoes invasive instrumentation throughout the transaction pipeline. Rather than tracking the use of resources that are actually consumed by an original request, the present invention captures a statistical set of information at each transaction stage in a transaction pipeline, wherein the statistical information describes the operational behavior of a particular portion of the transaction pipeline for a particular period of time. An agent within each stage of the transaction pipeline autonomously obtains performance metrics that are relevant for a given stage of the transaction pipeline, and the metric information is periodically reported. By collecting metric data from each stage within a transaction pipeline, a granular analysis of the performance of the transaction pipeline can be performed, and the end-to-end response time of the user can be improved by augmenting the resources at any stage in the transaction pipeline that has exhibited poor performance characteristics as indicated by the granular analysis.

It is important to note that while the present invention has been described in the context of a fully functioning data processing system, those of ordinary skill in the art will appreciate that some of the processes associated with the present invention are capable of being distributed in the form of instructions or similar means in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for monitoring a distributed data processing system, the method comprising:

providing a set of agents throughout the distributed data processing system;

associating each agent in the set of agents with a server in a set of servers in the distributed data processing system, wherein each server in the set of servers completes a requested transaction after requesting a subsequent transaction to a subsequent server in the set of servers; and configuring each agent in the set of agents to initiate a transaction and to obtain completion information about the transaction, wherein the transaction is directed to the subsequent server to which the server with which the agent is associated requests a subsequent transaction.

2. The method of claim 1 wherein the completion information comprises data related to the elapsed time that is required to complete the transaction at the subsequent server.

3. The method of claim 1 wherein the completion information comprises data related to the transaction concerning resource availability, resource consumption, or time delay at the subsequent server.

4. The method of claim 1 further comprising:

providing a primary agent in the distributed data processing system, wherein the primary agent is an agent that is not associated with a server in the set of servers; and configuring the primary agent to initiate transactions and to obtain completion information about the transactions, wherein the transactions are directed to at least one server in the set of servers.

5. The method of claim 4 further comprising:

establishing a logical order for each server in the set of servers; and initiating transactions by the primary agent to a logically first server in an ordered set of servers.

6. The method of claim 4 further comprising:

initiating a first transaction from a first agent in the set of agents to a first server in the set of servers; and obtaining completion information about the first transaction at the first agent.

7. The method of claim 6 further comprising:

initiating a second transaction to the first server from a second agent in the set of agents; and obtaining, at the second agent, completion information about the second transaction.

8. The method of claim 4 further comprising:

assigning a common transaction pipeline identifier to the set of agents; and distributing the common transaction pipeline identifier in configuration information to each agent in the set of agents, wherein the common transaction pipeline identifier identifies a transaction pipeline that the set of servers belong to, wherein receipt of a single transaction request invokes a set of transactions that are processed by the set of servers that belong to the transaction pipeline, and wherein the completion information is with respect to a given at least one of the set of transactions.

9. The method of claim 4 further comprising:
executing a script at an agent to initiate one or more transactions to one or more servers, wherein the script is selected based upon a transaction pipeline identifier associated with the script.

10. The method of claim 4 wherein configuration information for an agent in the set of agents comprises temporal information for indicating when the agent should initiate a transaction to the subsequent server.

11. The method of claim 4 further comprising:
collecting, at a specified server, completion information directly from each agent in the set of agents.

12. The method of claim 11 further comprising:
initiating collection of the completion information by the primary agent.

13. The method of claim 1 further comprising:
correlating the completion information from the plurality of agents, wherein the completion information that is correlated comprises transaction completion information associated with completion of each individual transaction directed to the subsequent server.

14. The method of claim 1 further comprising:
statistically analyzing the completion information from the plurality of agents, wherein the completion information that is statistically analyzed comprises transaction completion information associated with completion of each individual transaction directed to the subsequent server.

15. A method for monitoring a distributed data processing system, the method comprising:
providing a set of agents throughout the distributed data processing system, wherein the distributed data processing system supports a set of servers, wherein each server in the set of servers responds to a transaction request for a resource, wherein two or more servers are substantially logically grouped into a transaction pipeline in which an upstream server precedes a downstream server if the upstream server initiates a subsequent transaction to the downstream server so as to complete a previous transaction at the upstream server;
associating each agent in the set of agents with a server in the set of servers;
gathering metric data about transactions that are initiated by each agent in the set of agents, wherein each agent directs the transactions to a downstream server of the server with which each agent is associated; and
associating each agent in the set of agents with at least one server in the transaction pipeline, wherein at least one agent in the set of agents is also associated with another transaction pipeline.

16. The method of claim 15, wherein receipt of a single transaction request invokes a set of transactions that are processed by the two or more servers of the transaction pipeline, and wherein the metric data is with respect to a given at least one of the set of transactions.

17. The method of claim 16 wherein the metric data relates to an elapsed time that is required to complete a transaction at the downstream server.

18. A method for monitoring a distributed data processing system, the method comprising:
providing a set of agents throughout the distributed data processing system;
associating each agent in the set of agents with a server in a set of servers in the distributed data processing system;
gathering metric data about transactions that are initiated by each agent in the set of agents, wherein each agent directs transactions to a downstream server of the server with which each agent is associated, and wherein a downstream agent associated with the downstream server directs downstream transactions to a subsequent downstream server that is downstream from the downstream server responsive to receiving the transactions, and wherein the metric data is associated with responses from the downstream server and the subsequent downstream server; and
analyzing the metric data that is gathered from the set of agents.

19. The method of claim 18 further comprising:
determining response characteristics of each of the set of servers from the metric data.

20. The method of claim 18, wherein receipt of a single transaction request invokes a set of transactions that are processed by the two or more servers of the transaction pipeline, and wherein the metric data is with respect to a given at least one of the set of transactions.

21. A system for monitoring a distributed data processing system, comprising:
a processor;
a memory coupled to the processor for storing instructions, the instructions when executed by the processor performing a method comprising:
providing a set of agents throughout the distributed data processing system;
associating each agent in the set of agent's with a server in a set of servers in the distributed data processing system, wherein each server in the set of servers completes a requested transaction after requesting a subsequent transaction to a subsequent server in the set of servers; and
configuring each agent in the set of agents to initiate a transaction and to obtain completion information about the transaction, wherein the transaction is directed to the subsequent server to which the server with which the agent is associated requests a subsequent transaction.

22. The system of claim 21 wherein the completion information comprises data related to the elapsed time that is required to complete the transaction at the subsequent server.

23. The system of claim 21 wherein the completion information comprises data related to the transaction concerning resource availability, resource consumption, or time delay at the subsequent server.

24. The system of claim 21 further comprising:
providing a primary agent in the distributed data processing system, wherein the primary agent is an agent that is not associated with a server in the set of servers; and
configuring the primary agent to initiate transactions and to obtain completion information about the transactions, wherein the transactions are directed to at least one server in the set of servers.

25. The system of claim 24 further comprising:
establishing a logical order for each server in the set of servers; and
initiating transactions by the primary agent to a logically first server in an ordered set of servers.

26. The system of claim 24 further comprising:
initiating a first transaction from a first agent in the set of agents to a first server in the set of servers; and
obtaining completion information about the first transaction at the first agent.

27. The system of claim 26 further comprising:
initiating a second transaction to the first server from a second agent in the set of agents; and
obtaining, at the second agent, completion information about the second transaction.

28. The system of claim 24 further comprising:
assigning a common transaction pipeline identifier to the set of agents; and
distributing the common transaction pipeline identifier in configuration information to each agent in the set of agents, wherein the common transaction pipeline identifier identifies a transaction pipeline that the set of servers belong to, wherein receipt of a single transaction request invokes a set of transactions that are processed by the set of servers that belong to the transaction pipeline, and wherein the completion information is with respect to a given at least one of the set of transactions.

29. The system of claim 24 further comprising:
executing a script at an agent to initiate one or more transactions to one or more servers, wherein the script is selected based upon a transaction pipeline identifier associated with the script.

30. The system of claim 24 wherein configuration information for an agent in the set of agents comprises temporal information for indicating when the agent should initiate a transaction to the subsequent server.

31. The system of claim 24 further comprising:
collecting, at a specified server, completion information directly from each agent in the set of agents.

32. The system of claim 31 further comprising:
initiating collection of the completion information by the primary agent.

33. The system of claim 21 further comprising:
correlating the completion information from the plurality of agents, wherein the completion information that is correlated comprises transaction completion information associated with completion of each individual transaction directed to the subsequent server.

34. The system of claim 21 further comprising:
statistically analyzing completion information from the plurality of agents, wherein the completion information that is statistically analyzed comprises transaction completion information associated with completion of each individual transaction directed to the subsequent server.

35. A system for monitoring a distributed data processing system, comprising:
a processor;
a memory coupled to the processor for storing instructions, the instructions when executed by the processor performing a method comprising:
providing a set of agents throughout the distributed data processing system, wherein the distributed data processing system supports a set of servers, wherein each server in the set of servers responds to a transaction request for a resource, wherein two or more servers are substantially logically grouped into a transaction pipeline in which an upstream server precedes a downstream server if the upstream server initiates a subsequent transaction to the downstream server so as to complete a previous transaction at the upstream server;
associating each agent in the set of agents with a server in the set of servers;
gathering metric data about transactions that are initiated by each agent in the set of agents, wherein each agent directs the transactions to a downstream server of the server with which each agent is associated; and
associating each agent in the set of agents with at least one server in the transaction pipeline, wherein at least one agent in the set of agents is also associated with another transaction pipeline.

36. The system of claim 35, wherein receipt of a single transaction request invokes a set of transactions that are processed by the two or more servers of the transaction pipeline, and wherein the metric data is with respect to a given at least one of the set of transactions.

37. The system of claim 36 wherein the metric data relates to an elapsed time that is required to complete a transaction at the downstream server.

38. A system for monitoring a distributed data processing system, comprising:
a processor;
a memory coupled to the processor for storing instructions, the instructions when executed by the processor performing a method comprising:
providing a set of agents throughout the distributed data processing system;
associating each agent in the set of agents with a server in a set of servers in the distributed data processing system;
gathering metric data about transactions that are initiated by each agent in the set of agents, wherein each agent directs transactions to a downstream server of the server with which each agent is associated, and wherein a downstream agent associated with the downstream server directs downstream transactions to a subsequent downstream server that is downstream from the downstream server responsive to receiving the transactions, and wherein the metric data is associated with responses from the downstream server and the subsequent downstream server; and
analyzing the metric data that is gathered from the set of agents.

39. The system of claim 38 further comprising:
determining response characteristics of each of the set of servers from the metric data.

40. The system of claim 38, wherein receipt of a single transaction request invokes a set of transactions that are processed by the two or more servers of the transaction pipeline, and wherein the metric data is with respect to a given at least one of the set of transactions.

41. A computer program product stored in a non-transitory computer readable storage medium, the computer program product comprising computer executable instructions that when executed enable a distributed data processing system to monitor the distributed data processing system, the computer program product comprising:
instructions for providing a set of agents throughout the distributed data processing system;
instructions for associating each agent in the set of agents with a server in a set of servers in the distributed data processing system, wherein each server in the set of servers completes a requested transaction after requesting a subsequent transaction to a subsequent server in the set of servers; and
instructions for configuring each agent in the set of agents to initiate a transaction and to obtain completion information about the transaction, wherein the transaction is directed to the subsequent server to which the server with which the agent is associated requests a subsequent transaction.

42. The computer program product of claim 41 wherein the completion information comprises data related to the elapsed time that is required to complete the transaction at the subsequent server.

43. The computer program product of claim 41 wherein the completion information comprises data related to the transaction concerning resource availability, resource consumption, or time delay at the subsequent server.

44. The computer program product of claim 41 further comprising:
  instructions for providing a primary agent in the distributed data processing system, wherein the primary agent is an agent that is not associated with a server in the set of servers; and
  instructions for configuring the primary agent to initiate transactions and to obtain completion information about the transactions, wherein the transactions are directed to at least one server in the set of servers.

45. The computer program product of claim 44 further comprising:
  instructions for establishing a logical order for each server in the set of servers; and
  instructions for initiating transactions by the primary agent to a logically first server in an ordered set of servers.

46. The computer program product of claim 44 further comprising:
  instructions for initiating a first transaction from a first agent in the set of agents to a first server in the set of servers; and
  instructions for obtaining completion information about the first transaction at the first agent.

47. The computer program product of claim 46 further comprising:
  instructions for initiating a second transaction to the first server from a second agent in the set of agents; and
  instructions for obtaining, at the second agent, completion information about the second transaction.

48. The computer program product of claim 44 further comprising:
  instructions for assigning a common transaction pipeline identifier to the set of agents; and
  instructions for distributing the common transaction pipeline identifier in configuration information to each agent in the set of agents, wherein the common transaction pipeline identifier identifies a transaction pipeline that the set of servers belong to, wherein receipt of a single transaction request invokes a set of transactions that are processed by the set of servers that belong to the transaction pipeline, and wherein the completion information is with respect to a given at least one of the set of transactions.

49. The computer program product of claim 44 further comprising:
  instructions for executing a script at an agent to initiate one or more transactions to one or more servers, wherein the script is selected based upon a transaction pipeline identifier associated with the script.

50. The computer program product of claim 44 wherein configuration information for an agent in the set of agents comprises temporal information for indicating when the agent should initiate a transaction to the subsequent server.

51. The computer program product of claim 44 further comprising:
  instructions for collecting, at a specified server, completion information directly from each agent in the set of agents.

52. The computer program product of claim 51 further comprising:
  instructions for initiating collection of the completion information by the primary agent.

53. The computer program product of claim 41 further comprising:
  instructions for correlating completion information from the plurality of agents, wherein the completion information that is correlated comprises transaction completion information associated with completion of each individual transaction directed to the subsequent server.

54. The computer program product of claim 41 further comprising:
  instructions for statistically analyzing the completion information from the plurality of agents, wherein the completion information that is statistically analyzed comprises transaction completion information associated with completion of each individual transaction directed to the subsequent server.

55. A computer program product stored in a non-transitory computer readable storage medium, the computer program product comprising computer executable instructions that when executed enable a distributed data processing system to monitor the distributed data processing system, the computer program product comprising:
  instructions for providing a set of agents throughout the distributed data processing system, wherein the distributed data processing system supports a set of servers, wherein each server in the set of servers responds to a transaction request for a resource, wherein two or more servers are substantially logically grouped into a transaction pipeline in which an upstream server precedes a downstream server if the upstream server initiates a subsequent transaction to the downstream server so as to complete a previous transaction at the upstream server;
  instructions for associating each agent in the set of agents with a server in the set of servers;
  instructions for gathering metric data about transactions that are initiated by each agent in the set of agents, wherein each agent directs the transactions to a downstream server of the server with which each agent is associated; and
  instructions for associating each agent in the set of agents with at least one server in the transaction pipeline, wherein at least one agent in the set of agents is also associated with another transaction pipeline.

56. The computer program product of claim 55, wherein receipt of a single transaction request invokes a set of transactions that are processed by the two or more servers of the transaction pipeline, and wherein the metric data is with respect to a given at least one of the set of transactions.

57. The computer program product of claim 56 wherein the metric data relates to an elapsed time that is required to complete a transaction at the downstream server.

58. A computer program product stored in a non-transitory computer readable medium, the computer program product comprising computer executable instructions that when executed enable a distributed data processing system to monitor the distributed data processing system, the computer program product comprising:
  instructions for providing a set of agents throughout the distributed data processing system;
  instructions for associating each agent in the set of agents with a server in a set of servers in the distributed data processing system;
  instructions for gathering metric data about transactions that are initiated by each agent in the set of agents, wherein each agent directs transactions to a downstream server of the server with which each agent is associated, and wherein a downstream agent associated with the downstream server directs downstream transactions to a subsequent downstream server that is downstream from the downstream server responsive to receiving the transactions, and wherein the metric data is associated with responses from the downstream server and the subsequent downstream server; and instructions for analyzing the metric data that is gathered from the set of agents.

59. The computer program product of claim 58 further comprising:
   instructions for determining response characteristics of each of the set of servers from the metric data.

60. The computer program product of claim 58, wherein receipt of a single transaction request invokes a set of transactions that are processed by the two or more servers of the transaction pipeline, and wherein the metric data is with respect to a given at least one of the set of transaction.

* * * * *